United States Patent [19]
Renzi et al.

[11] Patent Number: 4,713,433

[45] Date of Patent: Dec. 15, 1987

[54] LIQUID AND POLYMERIZABLE COMPOSITION SUITABLE FOR THE PRODUCTION OF ORGANIC GLASSES ENDOWED WITH HIGH ABRASION STRENGTH

[75] Inventors: Fiorenzo Renzi, Gorgonzola; Franco Rivetti, Schio; Ugo Romano, Vimercate; Claudio Gagliardi, San Donato Milanese, all of Italy

[73] Assignee: Enichem Sintesi S.p.A., Palermo, Italy

[21] Appl. No.: 31,437

[22] Filed: Mar. 26, 1987

[30] Foreign Application Priority Data

Apr. 17, 1986 [IT] Italy .................................. 20124 A/86

[51] Int. Cl.$^4$ ............................................. C08F 220/26
[52] U.S. Cl. ...................................................... 526/314
[58] Field of Search ........................................... 526/314

[56] References Cited

U.S. PATENT DOCUMENTS 4,602,075  7/1986  Kida ..................................... 526/314

*Primary Examiner*—Paul R. Michl
*Attorney, Agent, or Firm*—Hedman, Gibson, Costigan & Hoare

[57] ABSTRACT

A liqid composition polymerizable under the influence of free-radical initiators to yield crosslinked polymers useful as organic glasses endowed with high abrasion strength, contains an oligomer allyl-carbonate with two end allyl groups, a monomer allyl-carbonate with at least four end allyl groups and possibly also one or more reactive diluents containing groups of allyl, vinyl or methacryl type.

8 Claims, No Drawings

LIQUID AND POLYMERIZABLE COMPOSITION SUITABLE FOR THE PRODUCTION OF ORGANIC GLASSES ENDOWED WITH HIGH ABRASION STRENGTH

The present invention relates to a liquid and polymerizable composition suitable to be transformed into crosslinked polymers, useful as organic glasses endowed with a high abrasion strength.

It is known that an increasing trend exists, in many application fields such as in transportation, building, optics ant technical articles in general, to replace mineral glass with polymeric organic glasses, because of the undoubted advantages of lightness, impact resistance, safety and workability these latter display.

Among the organic glasses known from the art, interesting are the products of polymerization of polyol bis(allylcarbonates), such as, e.g., those disclosed in European Pat. No. 35304 and among these the polymerization products of diethyleneglycol bis(allylcarbonate) are of preminent industrial interest, in particular in the branches of sun lenses and ophthalmic lenses, shields and protective peaks, and that in view of the optical and mechanical characteristics of such polymerisates.

A serious limitation to the use of glasses based on diethyleneglycol bis(allylcarbonate) resides however in their value of abrasion strength, which, although is higher than that of the most common thermoplastic organic glasses (polycarbonate and polymethylmethacrylate) results however considerably lower than that of mineral glass.

To the purpose of overcoming such a drawback, the art has resorted to the surface coating by particularly strong paints. However, such an operating way renders burdensome the process for production of the articles, and does not provide a final solution, owing to the possibility of peel-away or of degradation of the paint, due to the medium-term and long-term exposure to chemical and physical agents.

It has been found now that such a problem can be solved by means of the liquid and polymerisable composition of the present invention, which is able to set yielding crosslinked organic glasses endowed with such a high abrasion strength to render useless the application of surface coatings, and this with the transparency and the other typical desirable characteristics of the organic glasses based on diethyleneglycol bis(allylcarbonate) being kept unaltered.

Accordingly, the present invention relates to a liquid composition polymerisable to an organic glass endowed with a high abrasion strength, which contains:
from 20 to 80% by weight of an oligomeric or essentially oligomeric product (i.e., prevailingly constituted by oligomers) provided with two terminal allyl groups and definable by means of formula (I):

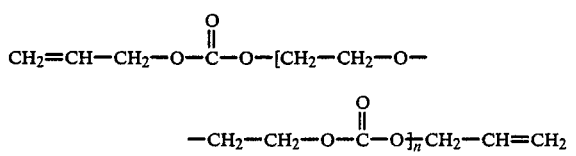

wherein: n assumes a value, or an average value, of from 2 to 5 (Component A);
from 20 to 50% by weight of a monomeric, or essentially monomeric product (i.e., prevailingly constituted by monomer), provided with at least four terminal allyl groups, definable by means of formula (II):

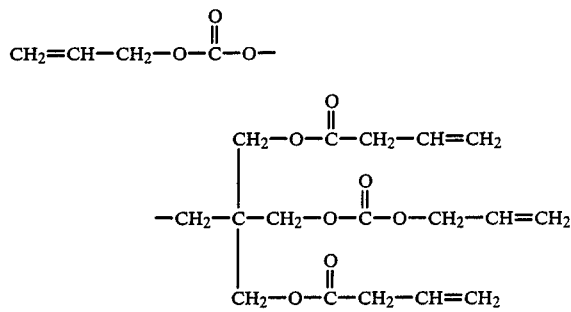

or by means of formula (III):

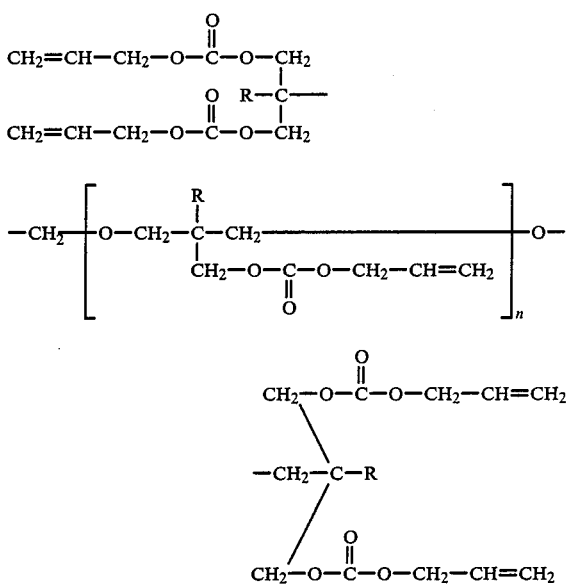

wherein: R is the methyl or ethyl group; or it can be represented by the formula:

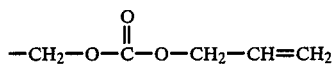

and n is either 0 or 1 (Component B);
from 0 to 35% by weight of one or more reactive diluents provided with groups of allyl, vinyl or methacryl type (Component C);
the composition containing furthermore a catalytically active amount of one or more substances able to generate free radicals.

The (A) component of the liquid and polymerisable composition of the present invention can be obtained by reacting, under transesterification conditions, and in the presence of a basic catalyst, diallylcarbonate and diethyleneglycol, in a mutual molar ratio of about 2/1, by operating under the general conditions as disclosed in above cited European patent.

By operating under such conditions, an essentially oligomeric reaction product is obtained, as a mixture of compounds to be defined by formula (I), constituted by about 60 to 70% by weight of oligomers having an average weight of the order of 3 in the above formula (I), the balance to 100% being constituted by monomer diethyleneglycol bis(allylcarbonate).

In the preferred form of practical embodiment, the liquid and polymerizable composition of the present invention contains from 35 to 70% by weight of Component (A).

The Component (B) of the liquid and polymerisable composition of the present invention can be obtained by reacting, under transesterification conditions, and in the presence of a basic catalyst, diallylcarbonate and an aliphatic polyol containing at least four alcoholic hydroxy groups in its molecule, in a mutual molar ratio equal to or higher than 4 diallylcarbonate mol per each hydroxy group of polyols, by operating under the general conditions as disclosed in above cited European patent.

Polyols suitable to that purpose are ditrimethylolpropane, pentaerythritol, di-pentaerythritol and tri-pentaerythritol.

By operating under such conditions as above disclosed, an essentially monomeric reaction product is obtained, i.e., constituted by about 60 to 70% by weight of compound (II).

In the preferred form of practical embodiment, the liquid and polymerizable composition of the present invention contains from 25 to 45% by weight of Component (B).

Component (C) of the liquid and polymerizable composition of the present invention is preferably present in an amount of from 0 to 25% by weight and is selected from diethyleneglycol bis(allylcarbonate), vinyl acetate and methyl methacrylate. As the diethyleneglycol bis(allylcarbonate), the pure monomeric compound can be used, or an essentially monomeric compound can be used, which is obtained by transesterification between diallylcarbonate and diethyleneglycol, in a mutual molar ratio equal to or higher than 8/1, containing at least 80% by weight of monomer, the balance to 100% being essentially constituted by bis(allyl-terminated) oligocarbonates corresponding to formula (I) with n=2 to 3.

The liquid composition of the present invention is polymerized by the effect of free radicals and hence, for polymerizing it, one or more polymerization initiators, soluble in the same composition and able to generate free radicals within a temperature range of from about 30° C. to about 120° C. are added.

Non limitative examples of such initators are diisopropylperoxydicarbonate, dicyclohexylperoxydicarbonate, di-sec-butylperoxydicarbonate, dibenzoylperoxide and tert-butylperbenzoate. The initiators are present in the liquid and polymerizable composition in an amount of from 1 to 6 parts by weight per each 100 parts by weight of the sum of components (A), (B) and (C).

The liquid and polymerizable composition of the present invention may additionally contain one or more conventional additives, such as stabilizers, release agents, dyes, pigments, UV or IR absorbers and the like, anyway in a total amount not higher than 1 part by weight per each 100 parts by weight of the sum of Components (A), (B) and (C).

The liquid and polymerizable composition of the present invention is converted into organic glasses by the casting technique, according to which technique the composition is polymerized inside moulds having a shape corresponding to the shape of the article to be produced, by operating at a temperature lower than the decomposition temperature of selected free-radical initiator.

Polymerization temperatures can generally vary within the range of from 30° C. to 120° C., as a function of the particular initiator used, with polymerization times generally ranging from 2 to 80 hours.

The so-obtained polymerisates are endowed with a desired whole of optical and mechanical characteristics and, above all, they show unusually high values of abrasion strength, as it will be evident from the hereunder experimental examples.

The optical articles endowed with such a whole of characteristics are particularly valuable in the field of ophthalmic lenses, shields, protective peaks, sheets and glasses for civil use, for transportation field, etc.

The following experimental examples are given to exemplifying purposes and are not limitative of the present invention.

In these examples, liquid and polymerizable compositions are used, which contain:

Component (A):

reaction product of diallylcarbonate with diethyleneglycol, in a molar ratio to each other of 2/1, by operating under transesterification conditions according to as disclosed in European Pat. No. 35304.

Said Component (A) can be represented by means of formula (I), with an average value of n equal to about 3, for the oligomer portion (oligomer contents=65% by weight); the balance to 100% being monomer diethyleneglycol bis(allylcarbonate).

Component (B):

as indicated in the following experimental examples.

Component (C):

as indicated in the following experimental examples.

The liquid and polymerizable compositions contain furthermore dicyclohexylperoxydicarbonate (DCPD), as the polymerization initiator, in the percentage as indicated in the examples.

With the compositions, 2 mm-thick neutral opthalmic lenses, and 8 mm-thick semifinished lenses are prepared, by the conventional casting technique.

According to this technique, the liquid composition is poured into the hollow of a mould, which reproduces the shape of the lens to be prepared, obtained by assembling two glass menisci, with a spacer gasket based on ethylene-vinyl acetate copolymer.

The liquid composition is then submitted to polymerization by heat treatment, carried out over 72 hours inside a forced air circulation oven, and at the temperature of 48° C.

At the end of this treatment, the moulds are opened, the lenses are recovered and are maintained at 110° C. for 2 further hours, to the purpose of decomposing the possible residual catalyst.

On so-obtained lenses, the following characteristics are determined.

(a) Optical Characteristics

Refractive index ($n_D^{20}$): measured by the Abbe refractometer (ASTM D-542)

Haze and Transmittance in visible range (%); measured by using Hazegard XL-211 by Gardner (ASTM D-1003)

Yellow index (YI), defined as:

$$YI = (100/Y) \cdot (1.277X - 1.06Z)$$

measured by XL-805 colorimeter by Gardner (ASTM D-1925).

(b) Physical and Mechanical Characteristics

Density: measured by the hydrostatic balance at the temperature of 25° C. (ASTM D-792)

Rockwell (M) hardness: measured by Rockwell Durometer (ASTM D-785)

Abrasion strength: measured by performing 25 cycles (50 runs) on the sample with a pad of steel wheel 00, of 5.5×7.5 cm of dimensions, loaded with a weight of 630 g.

The abrasion degree produced is evaluated by means of the visual observation of number, length and depth of the scratches, as compared with a corresponding reference sample based on diethyleneglycol bis(allylcarbonate) homopolymer. The abrasion strength is expressed by a number on a scale from 0 to 10, wherein value 10 is assigned to scratch-free sample, or to the sample which shows from 1 to 3 thin and shallow scratches, and value 0 is assigned to the completely scratched sample (case of diethyleneglycol bis(allylcarbonate) homopolymer, taken as the reference product). Intermediate values between 1 and 9 are assigned on the basis of the percentage of scratches displayed by the sample being investigated as compared to the reference sample. For example, if the sample displays 60% of scratches relatively to the reference sample, its value of abrasion strength is 4, if it displays 30% of scratches its value is 7, and so on.

Impact strength: the impact strength is measured by making a steel ball of 16 mm of diameter and 16.1 g of weight fall down (in free fall) from progressively increasing heights (1.27 m; 1.60 m; 2.0 m) on the convex surface of neutral lenses of 2.0 mm of thickness. The sample under investigation passes the test if, after the ball impact, it does not show any alterations (breakage, cracks).

EXAMPLE 1

Two two-component liquid and polymerizable compositions are prepared by starting from Component (A) as specified in the disclosure, and from Component (B), which in this specific case is pentaerythritol tetra(allylcarbonate), substantially corresponding to the above formula (II), prepared by means of the reaction of diallylcarbonate with pentaerythritol in a mutual molar ratio of 24/1.

Under these conditions, a product is obtained which is constituted by about 75–80% by weight by compound (II), the balance to 100% being allyl-terminated oligomers of same compound.

| Composition No. | 1 | 2 |
|---|---|---|
| Component (A) (% by weight) | 70 | 65 |
| Component (B) (% by weight) | 25 | 30 |
| DCPD (% by weight) | 5 | 5 |

The viscosity of the two compositions, before the addition of DCPD is respectively equal to 90 and 1000 cst at 25° C. The characteristics of the related polymerization products are reported in Table 1, in comparison with those of diethyleneglycol bis(allylcarbonate) homopolymer, taken as the reference product.

EXAMPLE 2

Five three-component liquid and polymerizable compositions are prepared by starting from Component (A) as specified in the disclosure, from Component (B) as of preceding Example 1, while Component (C) is the diethyleneglycol bis(allylcarbonate), obtained by means of the transesterification reaction between diallylcarbonate and diethyleneglycol, in a mutual molar ratio of 12/1.

This product contains about 85–90% by weight of monomer, the residual portion being essentially constituted by bis(allyl-terminated) oligomers corresponding to formula (I), with n=2 to 3.

| Composition No. | 3 | 4 | 5 | 6 | 7 |
|---|---|---|---|---|---|
| Component (A) (% by weight) | 60 | 55 | 50 | 55 | 50 |
| Component (B) (% by weight) | 30 | 30 | 30 | 35 | 35 |
| Component (C) (% by weight) | 5 | 10 | 15 | 5 | 10 |
| DCPD (% by weight) | 5 | 5 | 5 | 5 | 5 |

The viscosity of said compositions, before the addition of DCPD, are the following:

| Composition No. | 3 | 4 | 5 | 6 | 7 |
|---|---|---|---|---|---|
| Viscosity, 25° C. (cSt) | 84 | 77 | 75 | 105 | 95 |

The characteristics of the related polymerization products are reported in Table 2.

EXAMPLE 3

Two three-component liquid and polymerizable compositions are prepared by starting from Component (A) as specified in the disclosure, and from Component (B), as of preceding Example 1, whilst used Component (C) is vinyl acetate or mixtures of vinyl acetate and diethyleneglycol bis(allylcarbonate), this latter being defined as in Example 2.

| Composition No. | 8 | 9 |
|---|---|---|
| Component (A) (% by weight) | 57 | 55 |
| Component (B) (% by weight) | 35 | 32 |
| Vinyl acetate (% by weight) | 3 | 3 |
| Diethyleneglycol bis-allyl-carbonate (% by weight) | 1 | 5 |
| DCPD (% by weight) | 5 | 5 |

The viscosity of the two compositions, before the addition of DCPD, is respectively equal to 80 and 67 cst at 25° C. The characteristics of the related polymerization products are reported in Table 3.

EXAMPLE 4

Two three-component liquid and polymerizable compositions are prepared by starting from Component (A) as specified in the disclosure, from Component (B), which in this specific case is di-trimethylolpropane tetra(allylcarbonate), and from diethyleneglycol bis(allylcarbonate), defined as in Example 2, as the Component (C).

Component (B) corresponds substantially to the above formula (III), as reported in the disclosure, wherein R=ethyl and n=0; it is prepared by means of the reaction of diallylcarbonate with di-trimethylolpropane in a mutual molar ratio of 24/1.

Under these conditions, a product is obtained which is constituted by about 75–80% by weight by compound (III), the balance to 100% being allyl-terminated oligomers of same compound.

| Composition No. | 10 | 11 |
|---|---|---|
| Component (A) (% by weight) | 45 | 35 |
| Component (B) (% by weight) | 40 | 40 |
| Component (C) (% by weight) | 10 | 20 |
| DCPD (% by weight) | 5 | 5 |

The viscosity of the two compositions, before the addition of DCPD is respectively equal to 107 and 86 cst at 25° C. The characteristics of the related polymerization products are reported in Table 4.

EXAMPLE 5

Two liquid and polymerizable compositions are prepared by starting from Component (A) as specified in the disclosure, from Component (B), which in this specific case is di-pentaerythritol hexa(allylcarbonate), and from diethyleneglycol bis(allylcarbonate), defined as in Example 2, as the Component (C).

Component (B), substantially corresponding to above formula (III) as reported in the disclosure, wherein R=CH$_2$—O—CO—O—CH$_2$—CH=CH$_2$ and n=0, is prepared by means of the reaction of diallylcarbonate with di-pentaerythritol in a mutual molar ratio of 36/1.

Under these conditions, a product is obtained which is constituted by about 70-75% by weight by above compound (III), the balance to 100% being allylterminated oligomers of same compound.

| Composition No. | 12 | 13 |
|---|---|---|
| Component (A) (% by weight) | 40 | 55 |
| Component (B) (% by weight) | 35 | 30 |
| Component (C) (% by weight) | 20 | 10 |
| DCPD (% by weight) | 5 | 5 |

The viscosity of said compositions, before the addition of DCPD is respectively equal to 136 and 140 cst at 25° C. The properties of the related polymerization products are reported in Table 5.

TABLE 1

| Composition No. | 1 | | 2 | | Diethyleneglycol bis(allylcarbonate) homopolymer |
|---|---|---|---|---|---|
| n$_D^{20}$ | 1.500 | | 1.501 | | 1.501 |
| Density, 25° C. (g/ml) | 1.331 | | 1.3315 | | 1.331 |
| Lens thickness (mm) | 2 | 3 | 2 | 2 | 8 |
| YI | 0.79 | 2.40 | 0.96 | 0.65 | 2.2 |
| Haze (%) | 0.21 | — | 0.19 | 0.22 | 0.3 |
| Transmittance in visible range (%) | 93.1 | 92.6 | 93 | 93.1 | 92. |
| Rockwell hardness (M) | 98 | 103 | 103 | 90 | 98 |
| Abrasion resistance | 6/7 | 6/7 | 7 | 0 | 0 |
| Impact resistance, | | | | | |
| 1.27 m | passes | — | passes | passes | — |
| 1.60 m | passes | — | passes | passes | — |
| 2.00 m | passes | — | passes | passes | — |

TABLE 2

| Composition No. | 3 | 4 | 5 | 6 | 7 |
|---|---|---|---|---|---|
| n$_D^{20}$ | 1.501 | 1.502 | 1.502 | 1.502 | 1.503 |
| Density, 25° C. (g/ml) | 1.332 | 1.332 | 1.330 | 1.335 | — |
| Lens thickness (mm) | 8 | 2 | 2 | 2 | 2 |
| YI | 2.94 | 1.1 | 1.01 | 1.35 | 1.4 |
| Haze (%) | — | 0.2 | 0.26 | 0.2 | 0.15 |
| Transmittance in visible range (%) | 92.3 | 92.9 | 93.1 | 92.7 | 92.6 |
| Rockwell hardness (M) | 107 | 105 | 107 | 107 | 108 |
| Abrasion resistance | 7/8 | 8 | 8/9 | 8/9 | 9 |
| Impact resistance, | | | | | |
| 1.27 m | — | passes | passes | passes | passes |
| 1.60 m | — | passes | passes | passes | passes |
| 2.00 m | — | passes | passes | passes | passes |

TABLE 3

| Composition No. | 8 | 9 |
|---|---|---|
| n$_D^{20}$ | 1.501 | 1.501 |
| Density, 25° C. (g/ml) | — | 1.328 |
| Lens thickness (mm) | 2 | 2 |
| YI | 1.25 | 1.0 |
| Haze (%) | 0.2 | 0.2 |
| Transmittance in visible range (%) | 92.6 | 92.9 |
| Rockwell hardness (M) | 105 | 103 |
| Abrasion resistance | 8/9 | 7/8 |
| Impact resistance, | | |
| 1.27 m | passes | passes |
| 1.60 m | passes | passes |
| 2.00 m | passes | passes |

TABLE 4

| Composition No. | 10 | | 11 |
|---|---|---|---|
| n$_D^{20}$ | 1.502 | | 1.503 |
| Density, 25° C. (g/ml) | 1.290 | | 1.290 |
| Lens thickness (mm) | 2 | 8 | 2 |
| YI | 0.90 | 2.85 | 1.05 |
| Haze (%) | 0.2 | — | 0.15 |
| Transmittance in visible range (%) | 92.9 | 91.8 | 92.8 |
| Rockwell hardness (M) | 97 | 105 | 99 |
| Abrasion resistance | 6 | 6 | 6/7 |
| Impact resistance, | | | |
| 1.27 m | passes | — | passes |
| 1.60 m | passes | — | passes |
| 2.00 m | passes | — | passes |

TABLE 5

| Composition No. | 12 | | 13 | |
|---|---|---|---|---|
| n$_D^{20}$ | — | | — | |
| Density, 25° C. (g/ml) | 1.327 | | — | |
| Lens thickness (mm) | 2 | 8 | 2 | 8 |
| YI | 1.95 | 6.5 | 1.05 | 3.6 |
| Haze (%) | 0.30 | — | 0.30 | — |
| Transmittance in visible range (%) | 92.2 | 90.1 | 92.5 | 90.3 |
| Rockwell hardness (M) | 111 | — | 108 | — |
| Abrasion resistance | 9/10 | — | 7/8 | — |
| Impact resistance, | | | | |
| 1.27 m | passes | — | passes | — |
| 1.60 m | passes | — | passes | — |
| 2.00 m | passes | — | passes | — |

We claim:
1. Liquid composition polymerisable to organic glasses endowed with a high abrasion strength, characterized in that it contains:
from 20 to 80% by weight of an oligomeric or essentially oligomeric product provided with two terminal allyl groups, definable by means of formula (I):

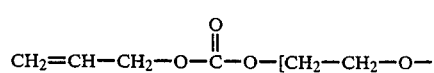

$$-CH_2-CH_2-O-\overset{O}{\underset{\|}{C}}-O\!\!-\!\!]_n CH_2-CH=CH_2$$

wherein: n assumes a value, or an average value, of from 2 to 5 (Component A);

from 20 to 50% by weight of a monomeric, or essentially monomeric product provided with at least four terminal allyl groups, definable by means of formula (II):

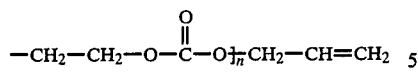

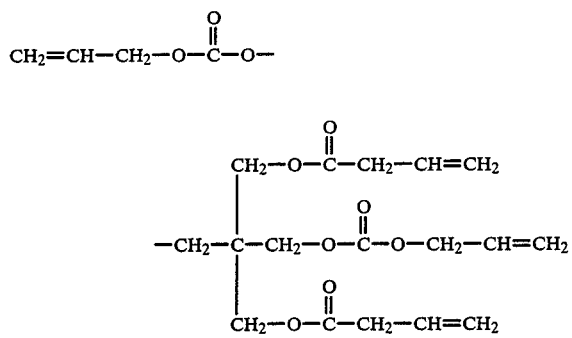

or by means of formula (III):

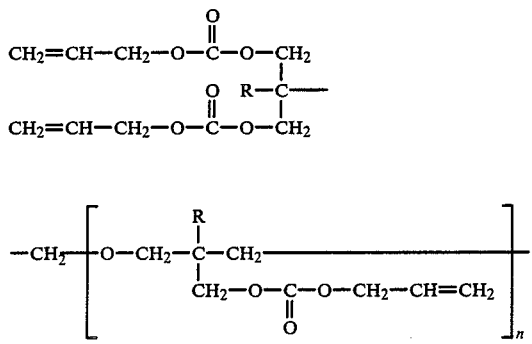

-continued

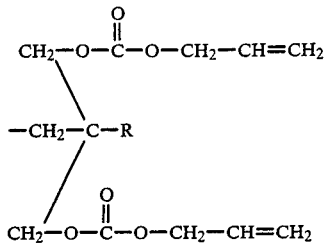

wherein: R is the methyl or ethyl group; or it can be represented by the formula:

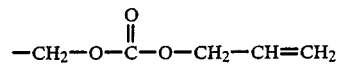

and n is either 0 or 1 (Component B);

from 0 to 35% by weight of one or more reactive diluents provided with groups of allyl, vinyl or methacryl type (Component C).

2. Compositions according to claim 1, wherein Component (A) is the product of transesterification of diallylcarbonate and diethyleneglycol in a mutual molar ratio of about 2/1.

3. Composition according to claim 1, wherein Component (B) is obtained by reacting, under transalkylation conditions, diallylcarbonate and an aliphatic polyol containing at least four alcoholic hydroxy groups in its molecule, with a ratio of at least 4 mol of diallylcarbonate per each hydroxy group of polyol.

4. Composition according to claim 3, wherein said polyol is selected from di-trimethylolpropane, pentaerythritol, di-pentaerythritol and tripentaerythritol.

5. Composition according to claim 1, wherein said Component (C) is selected from diethyleneglycol bis(allylcarbonate), vinyl acetate ane methyl metacrylate.

6. Composition according to claim 1, characterized in that it contains from 35 to 70% by weight of Component (A), from 25 to 45% by weight of Component (B) and from 0 to 25% by weight of Component (C).

7. Composition according to claim 1, characterized in that it contains furthermore a free-radical initiator, in an amount of from 1 to 6 part by weight per each 100 parts by weight of the sum of Components (A), (B) and (C).

8. Optical glasses obtained by polymerization of composition according to claim 7.

* * * * *